United States Patent
Conorich et al.

(10) Patent No.: US 6,302,699 B1
(45) Date of Patent: Oct. 16, 2001

(54) TWENTY EIGHT PAIR CABLING SYSTEM

(75) Inventors: Theodore A. Conorich, Parsippany Township, Morris County; Michael G. German, Secaucus; William J. Ivan, Woodbridge, all of NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/329,573

(22) Filed: Jun. 10, 1999

Related U.S. Application Data

(60) Provisional application No. 60/129,562, filed on Apr. 16, 1999.

(51) Int. Cl.[7] .............................. H01R 29/00; H02B 1/056
(52) U.S. Cl. .............................................. 439/49; 439/719
(58) Field of Search ..................... 439/49, 719; 361/823, 361/827

(56) References Cited

U.S. PATENT DOCUMENTS

| | | | |
|---|---|---|---|
| 4,865,565 | * | 9/1989 | Heidorn ................................ 439/622 |
| 5,312,270 | * | 5/1994 | Siemon et al. ........................ 439/532 |
| 5,575,665 | * | 11/1996 | Shramawick et al. ................. 439/49 |
| 5,649,829 | * | 7/1997 | Miller et al. ........................ 439/76.1 |
| 5,718,604 | | 2/1998 | Conorich et al. . |
| 5,741,157 | * | 4/1998 | O'Connor et al. .................... 439/532 |
| 6,159,020 | * | 12/2000 | Baker et al. ............................ 439/49 |

\* cited by examiner

Primary Examiner—Brian Sircus
Assistant Examiner—Hae Moon Hyeon
(74) Attorney, Agent, or Firm—Gibbons, Del Deo, Dolan Griffinger & Vecchione

(57) ABSTRACT

A twenty eight pair cabling system comprises a conductor termination array having twenty-eight pairs of termination ports. The termination array is able to engage seven four-pair cable conductors and seven four-pair connecting blocks. Row marking surfaces have been moved, making room for expanding the prior art termination array by three port pairs. The termination array and cable organizer assembly is the same length as the old wiring block, resulting in increased wiring density.

5 Claims, 4 Drawing Sheets

TWENTY EIGHT PAIR CABLING SYSTEM

This application claims the benefit of U.S. Provisional Application Ser. No. 60/129,562, filed on Apr. 16, 1999. This application is related to copending application Ser. No. 09/330,120 entitled "Cable Cover" filed on Jun. 10, 1999, copending application Ser. No. 09/329,438 entitled "Cable Organizer With Conductor Termination Array" filed on Jun. 10, 1999, and copending application Ser. No. 09/329,444 entitled "Printed Wiring Board Cable Cover" filed on Jun. 10, 1999.

FIELD OF THE INVENTION

This invention relates to the field of telecommunications, and more particularly to connectors for use in telecommunication system cabling.

BACKGROUND OF THE INVENTION

The telecommunications and data management industries utilize connective hardware for general building wiring, premises distribution systems, local area networks, and other network applications. The connective hardware known as the 110 Connector Systems has become a standard of the industry because of the reliable gas-tight connection provided by the 110 Insulation Displacement Connector. This miniature quick-connect terminating system is listed or approved by Underwriters Laboratories, the Canadian Standards Association, and the Australian Standards Association. The 110 Connector Systems have gained type approval from such countries as the United Kingdom, Japan, Korea, and others.

The 110 Connector Systems are used to manage the horizontal and main cross-connect administration fields. The main cross-connect is typically located in the equipment room and provides termination and cross-connection of network interface equipment, switching equipment, processor equipment, and backbone (riser or campus) wiring. The horizontal cross-connect is typically located in the telecommunications closet and provides termination and cross-connection of horizontal (to the work area) and backbone wiring. Cross-connects allow for easy administration of routing and rerouting common equipment circuits to various parts of a building or campus. This equipment supports both analog and digital voice transmission, as well as high speed data applications that currently run over unshielded twisted pair cables.

Referring now to FIGS. 1, 2, and 3, the prior art 110 Connector System 10 was designed to have its connector ports 15 arranged in horizontal rows in uniformly spaced conductor termination arrays (index strips). FIG. 1 shows four rows of index strips 14 mounted in a typical wiring block 12. The spaces between these index strips become troughs, and are alternately dedicated as either cable routing troughs 16 or cross-connect wire routing troughs 18.

Unsheathed cable conductors from cables 20 are routed through the cable troughs 16 to their appropriate termination ports in the index strips 14. All cable sheaths stop at the entrance to the cable troughs 16. Each cable trough 16 feeds conductors to the two index strips that form its sides.

Connecting blocks 22, each containing several contact elements 24 in pairs, are placed over the index strips 14 and make electrical connections to the conductors in cables 20. These connecting blocks 22 also form the side walls of the troughs 16 and 18. A designation strip 26 is placed within the cable trough 16, near the top of the connecting blocks 22. This strip 26 extends the full length of the cable trough 16, covering the conductors in cables 20, and allows the cable connector ports 15 to be visibly labeled as an indication of where the other end of the cables are attached. A pair of row marking surfaces 27 are provided to label each row.

Cross-connect wire (not shown) or patchcords 28 are terminated in the ports 25 on the top of the connecting blocks 22. Cross-connect wires, when used, are routed to their appropriate ports 25 through the cross-connect troughs 18 between the cable troughs 16. The connecting blocks 22 form the separator between conductors in cables 20 and cross-connect conductors. When patchcords 28 are used, the cross-connect troughs 18 remain empty.

The 110 patchcords 28 are available now in two versions. The old version is a forward-engaging patchcord 28 that uses a forward-engaging plug 30 as shown in FIG. 1. The patchcord 28 projects outward from the connecting block 22, is routed through ducts 32, backboards 34, and troughs 36 to another connecting block 22, as shown in FIG. 3. The new version patchcord uses a reverse-engaging plug. The reverse-engaging patchcord is further described in U.S. Pat. No. 5,718,604 entitled Patch Cord Connection System issued on Feb. 17, 1998 and is incorporated herein by reference.

The prior art 110 connector system has a conductor termination array 14 with twenty-five pair array termination ports 15, each termination port handling one pair of wires. This would terminate one 25-pair cable using all termination ports, or six 4-pair cables with one termination port left unused. FIG. 1 shows six 4-pair connecting blocks 22 engaging the array 14, leaving one termination port unused, as indicated at 15. The row marking surfaces 27 are located at each end of each row.

SUMMARY OF THE INVENTION

In accordance with the present invention, there is provided a twenty eight pair cabling system, for use in connection with a cable organizer, cable cover, cable conductors, a connecting block, and a patchcord plug. The cabling system comprises a conductor termination array having twenty-eight pairs of termination ports. Each port pair is able to engage one pair of conductors. The termination array is able to engage seven four-pair cable conductors and seven four-pair connecting blocks.

BRIEF DESCRIPTION OF THE DRAWING

A more complete understanding of the present invention may be obtained from consideration of the following description in conjunction with the drawing, in which.

DESCRIPTION OF THE PREFERRED EMBODIMENTS

Figure 4:
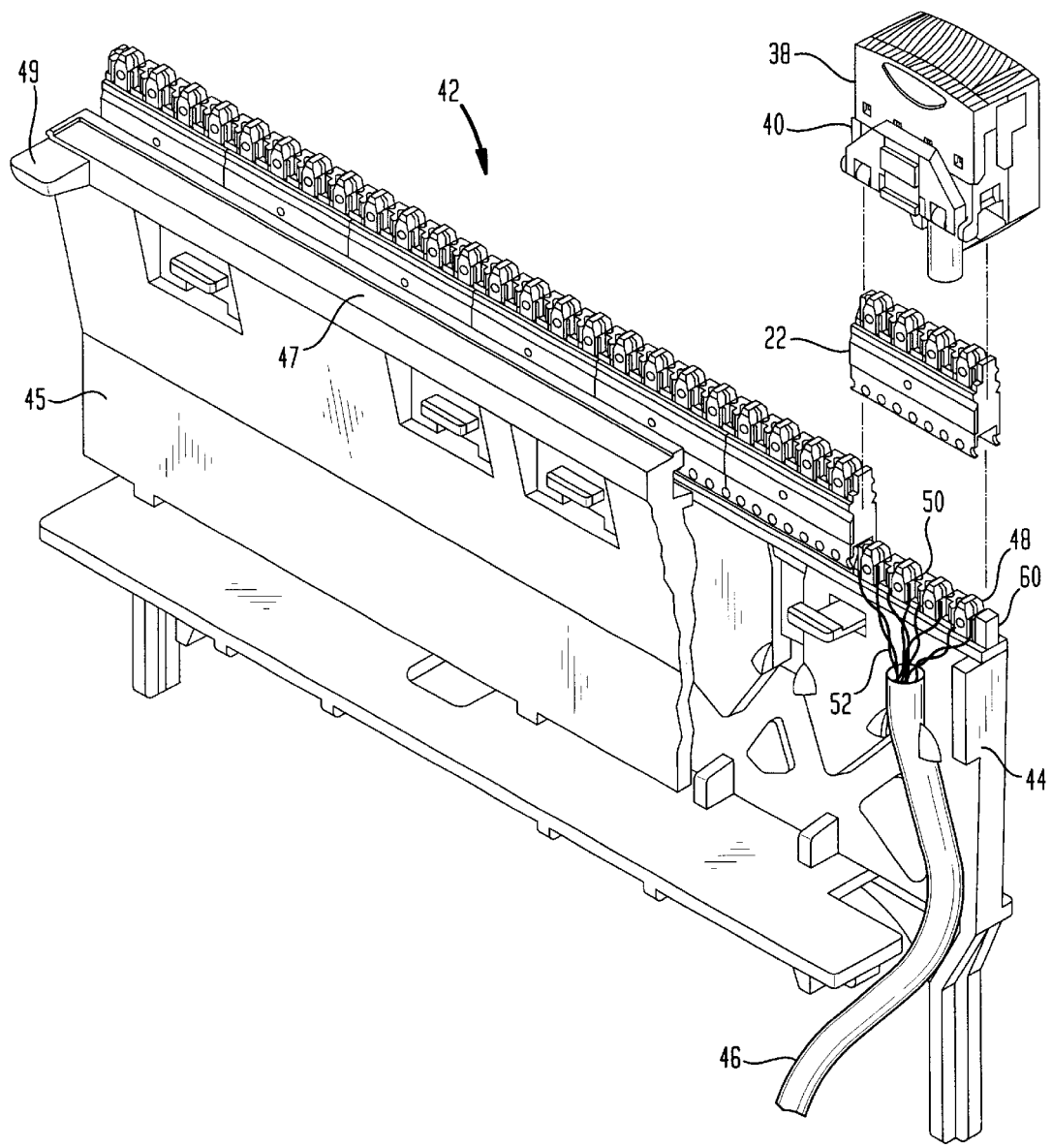
FIG. 4 is a perspective view of a twenty eight pair cabling system constructed in accordance with the invention showing a cable organizer, a cable cover partially cut-away, a conductor termination array, connecting blocks, and a patchcord plug in a partially exploded assembly.

Referring now to FIG. 4, the 110 connector system of the invention includes a cable organizer 44, a conductor termination array 48 mounted upon the cable organizer 44, and a cable cover 45. The cable cover 45 has row marking surfaces 49 located over the trough adjacent the end of each row, as shown in FIG. 4. This arrangement frees room at the end of each row for additional termination ports 15. In today's competitive telecommunications market, maximum conductor density per wiring block is needed.

Figure 5:
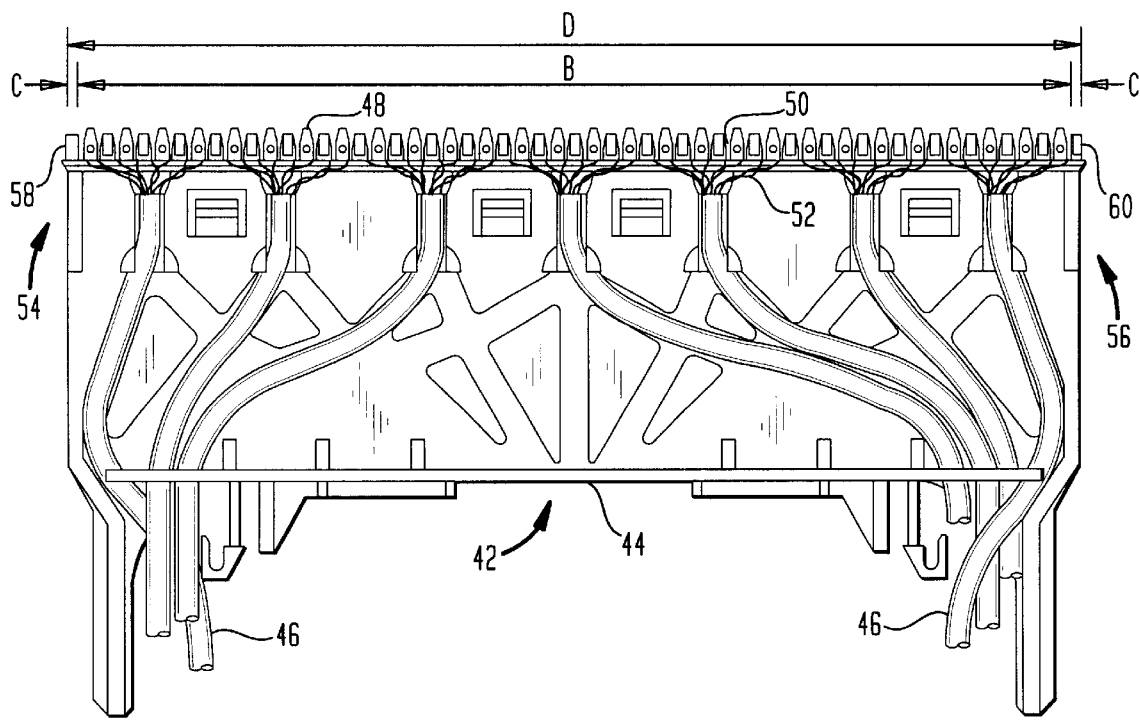
FIG. 5 is a front elevational view of the twenty eight pair cabling system of FIG. 4, showing the cable organizer, the conductor termination array, and seven 4-pair conductor cables.
Figure 6:
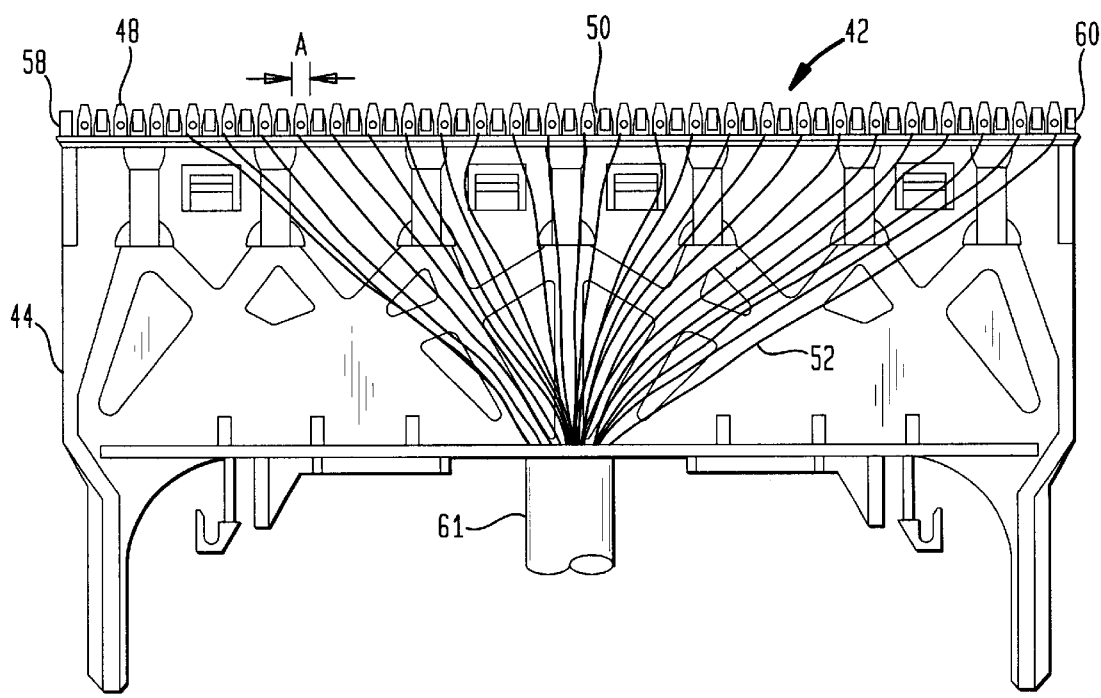
FIG. 6 is a front elevational view of the twenty eight pair cabling system of FIG. 4, showing the cable organizer, the conductor termination array, and one twenty five pair conductor cable.

Referring now to the drawings, and especially to FIGS. 4, 5, and 6, a twenty eight pair cabling system is shown at 42, and is used in connection with a cable organizer 44, a cable cover 45 having a circuit designation surface 47 and row marking surfaces 49, cable conductors 46, a connecting block 22, and a patchcord plug 40. The cabling system 42 comprises a conductor termination array 48 mounted on the cable organizer 44. The termination array 48 has twenty-eight pairs of termination ports 50, each port pair 50 being able to engage one pair of conductors 52. The ports 50 are spaced at approximately 0.15 inch (0.38 cm) center-to-center, as shown at A in FIG. 6. Thus, twenty-eight pairs of ports 50 will occupy approximately 8.40 inches (21.34 cm), as shown at B in FIG. 5.

Figure 1:
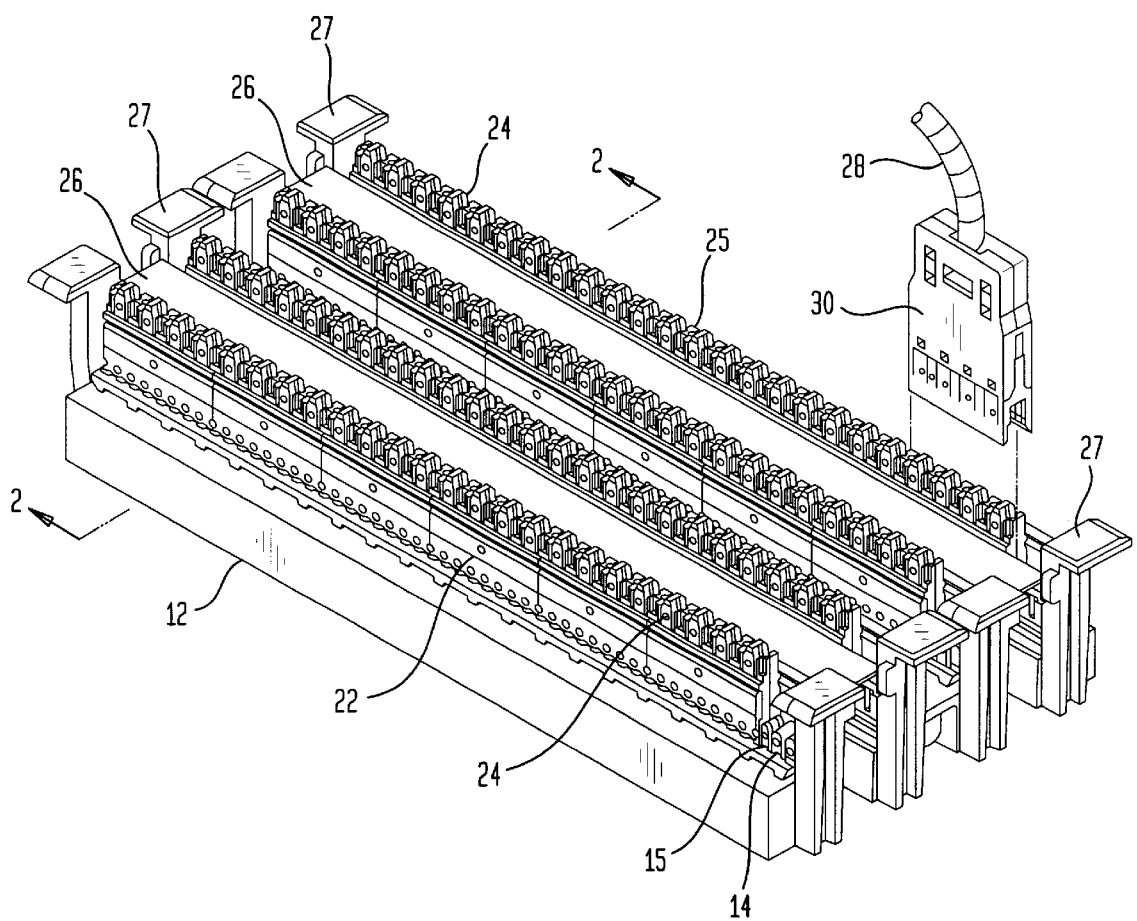
FIG. 1 is a perspective view of a prior art wiring block, including connection blocks and a forward-engaging patchcord plug.
Figure 2:
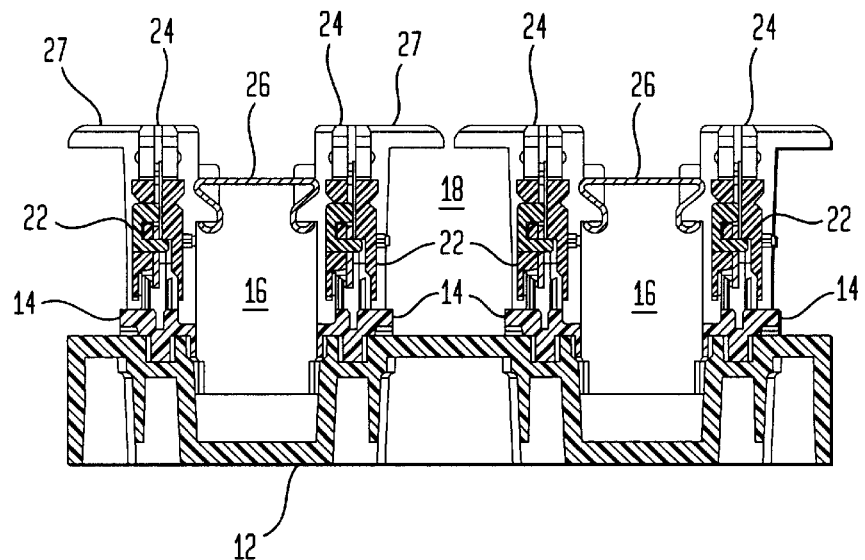
FIG. 2 is a cross-sectional view of the prior art wiring block of FIG. 1, taken along lines 2—2 of FIG. 1.
Figure 3:
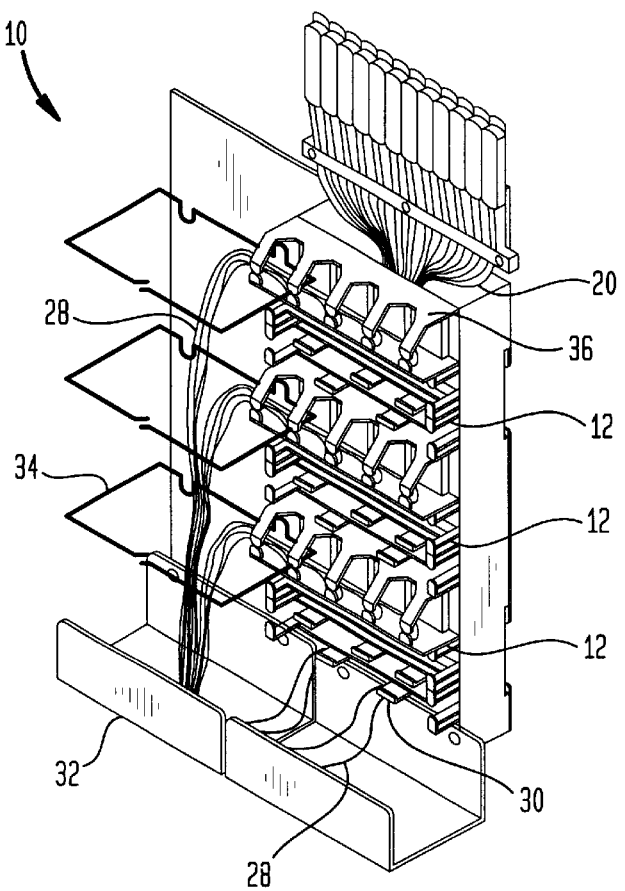
FIG. 3 is a perspective view of a prior art 110 Connector System, showing the prior art wiring block, patchcords and troughs.

The prior art wiring block 12, having twenty-five pairs of termination ports, could accommodate only six four-pair cable conductors and six four-pair connecting blocks, with one pair left unused, as shown in FIG. 1. The new termination array 48 is able to engage seven four-pair cable conductors 46, as illustrated in FIG. 5. and seven four-pair connecting blocks, as shown in FIG. 4. This is accomplished by expanding the old termination array 14 by three port pairs. The old row marking surfaces 27 were at the end of the wiring block 12. The new row marking surfaces 49 are on the side of the cable cover 45, making room for the expansion. A twenty-five-pair cable 61 can be installed, as depicted in FIG. 6, leaving three port pairs open.

The termination array 48 has opposite first 54 and second 56 ends. The termination array 48 has a first end member 58 disposed at the termination array first end 54. A second end member 60 is disposed at the termination array second end 56. Each end member 58 and 60 is approximately 0.06 inch (0.15 cm) in length as indicated by C. The total termination array length is approximately 8.52 inches (21.64 cm) indicated by D, as illustrated in FIG. 5. The termination array 48 is approximately the same length as the cable organizer 44, and is the same length as the old wiring block 12. Thus, the wiring density has been increased by about 16%.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which will come within the scope of the appended claims is reserved.

What is claimed is:

1. A twenty eight pair cabling system, for use in connection with a cable organizer, cable conductors, a connecting block, and a patchcord plug, the cabling system comprising a conductor termination array having twenty-eight pairs of termination ports aligned in a row, each port pair configured to engage one pair of conductors, the termination array configured to engage seven four-pair cable conductors and seven four-pair connecting blocks, said system having a cable cover having a row marking surface formed thereon to provide identification for said conductor termination array, said row marking surface being disposed laterally to said aligned row of said termination ports.

2. The cabling system of claim 1, wherein the conductor termination array further comprises:

opposite first and second ends;

a first end member disposed at the termination array first end; and a second end member disposed at the termination array second end.

3. The cabling system of claim 2, wherein:

the ports are evenly spaced center-to-center, forming twenty-eight pairs of ports between each end member, so that the total conductor termination array length is not greater than 8.52 inches (21.64 cm) and the cable organizer length is not greater than the conductor termination array length.

4. The cabling system of claim 1, wherein the termination array is not less than the cable organizer length.

5. A twenty-eight pair cabling system, for use in connection with a cable organizer, cable conductors, and a connecting block, the cabling system comprising a conductor termination array wherein:

the termination array has twenty-eight pairs of termination ports aligned in a row, each port pair configured to engage one pair of conductors, the ports being spaced at 0.15 inch (0.38 cm) center-to-center, so that twenty-eight pair of ports will occupy 8.4 inches (21.34 cm);

the termination array configured to engage seven four-pair cable conductors and seven four-pair connecting blocks;

the termination array has opposite first and second ends;

the termination array has a first end member disposed at the termination array first end;

the termination array has a second end member disposed at the termination array second end, each end member being 0.06 inch (0.15 cm) in length, whereby the total termination array length is 8.52 inches (21.64 cm);

the termination array is the same length as the cable organizer and;

said system further having a cable cover having a row marking surface formed thereon to provide identification for said array, said row marking surface being disposed laterally to said aligned row of said termination ports.

* * * * *